United States Patent [19]
Abdel-Mottaleb et al.

[11] Patent Number: 6,163,622
[45] Date of Patent: *Dec. 19, 2000

[54] IMAGE RETRIEVAL SYSTEM

[75] Inventors: Mohammed S. Abdel-Mottaleb, Ossining, N.Y.; Ranjit P. Desai, Framingham, Mass.

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/993,130

[22] Filed: Dec. 18, 1997

[51] Int. Cl.$^7$ ...................................................... G06K 9/00
[52] U.S. Cl. ................................. 382/170; 882/305; 707/6
[58] Field of Search ............................ 382/170, 305–306, 382/165, 167, 168, 173, 209, 218–219; 707/1–10, 104, 528, 530; 358/403–404

[56] References Cited

U.S. PATENT DOCUMENTS

| | | | |
|---|---|---|---|
| 4,606,065 | 8/1986 | Beg et al. | 382/170 |
| 4,979,225 | 12/1990 | Tsujiuchi et al. | 382/165 |
| 5,048,095 | 9/1991 | Bhanu et al. | 382/173 |
| 5,724,442 | 3/1998 | Ogatsu et al. | 382/167 |
| 5,793,888 | 8/1998 | Delanoy | 382/219 |
| 5,809,171 | 9/1998 | Neff et al. | 382/209 |

FOREIGN PATENT DOCUMENTS 0 627 726 A1   12/1994   European Pat. Off. ..........   G10L 3/00

OTHER PUBLICATIONS

"Tools and Techniques for Color Image Retrieval", John R. Smith and Shih Fu Chang, Proc. SPIE—Int. Soc. Opt. Eng (USA), vol. 2670, pp. 426–437.

"Information Theory: Coding Theorems for Discrete Memoryless Systems", I. Csizar and J. Korner, Akademi Kiado, Budapest, 1981, pp. 19–22.

Jau–Yuen Chen et al.; "Multiscale Branch and Bound Image Database Search", In: Proceedings of the SPIE, San Jose, CA, Feb. 1997, vol. 3022, ISBN 0–8194–2433–1, pp. 133–134.

*Primary Examiner*—Leo H. Boudreau
*Assistant Examiner*—Ishrat Sherali
*Attorney, Agent, or Firm*—Gregory L. Thorne

[57] ABSTRACT

In an image retrieval system, a database with a large number of images is searched to find one or more images meeting the specification of a user. This specification is given in the form of a query image. The system determines the similarity between the query image and a particular image from the database by comparing the color histograms of the two images. The histograms are treated as statistical distributions and the similarity is determined on the basis of an information theoretic measure of the distributions. In a first embodiment, the similarity is determined using the Kullback informational divergence of the two histograms. In a second embodiment, the similarity is based on the entropy of the distribution of similarity coefficients of the two histograms is used.

9 Claims, 4 Drawing Sheets

IMAGE RETRIEVAL SYSTEM

BACKGROUND OF THE INVENTION

The invention relates to an image retrieval system which includes a database with candidate images, an entry unit for entering a query image, and a first histogram unit for deriving a first query color histogram from the query image.

A second histogram unit derives a first candidate color histogram from a particular candidate image. Also a determining unit determines a first similarity between the particular candidate image and the query image on the basis of the first candidate color histogram and the first query color histogram, and a retrieval unit retrieves of the particular candidate image.

The invention further relates to a method for determining a similarity between a candidate image and a query image.

A first step obtains the query image, a second step derives a query color histogram from the query image, a third step obtains a candidate color histogram from the candidate image, and a determining step determines the similarity between the particular candidate image and the query image on the basis of the candidate color histogram and the query color histogram.

Image retrieval systems are of importance for applications that involve large collections of images. Professional applications include broadcast stations where a piece of a video may be identified through a set of shots and where a shot of video is to be retrieved according to a given image. Also movie producers must be able to find back scenes from among a large number of scenes. Furthermore, art museums have large collections of images, from their paintings, photos and drawings, and must be able to retrieve images on the basis of some criterion. Consumer applications include maintaining collections of slides, photos and videos, from which the user must be able to find back items.

An image retrieval system and a method as described above, are known from the article "Tools and Techniques for Color Image Retrieval", John R. Smith and Shih-Fu Chang, Proc. SPIE—Int. Soc. Opt. Eng (USA), Vol. 2670, pp. 426–437. The image retrieval system includes a database with a large number of images. A user searching for a particular image specifies a query image as to how the retrieved image or images should lock like. Then the system compares the stored images with the query image and ranks the stored image according to their similarity with the query image. The ranking results are presented to the user who may retrieve one or more of the images. The comparison of the query image with a stored image to determine the similarity may be based on a number of features derived from the respective images. The article describes the usage of a color histogram as such a comparison feature. When using the RGB (Red, Green and Blue) representation of an image, a color histogram is computed by quantizing the colors within the image and counting the number of pixels of each color. To determine the similarity, a number of techniques are described to compare the two color histograms of the respective images. The histogram euclidean distance is a simple measure calculated by comparing identical bins in respective histograms. No cross-wise comparison is made between different bins which represent perceptually similar colors. Furthermore, techniques for determining a histogram intersection and techniques for determining a histogram quadratic distance are described. As an alternative to the histogram techniques, a comparison technique based on color sets is described. In this technique the color of a pixel is compared with a predetermined threshold. If the color is below the threshold, the pixel does not become a member of the set and otherwise it does become a member. A disadvantage is that a large number of pixels, all below the threshold, will not contribute in the comparison in any way. Furthermore, there is no discrimination between values above the threshold. The prior art techniques for determining the similarity between the candidate image and the query image are complex to execute and/or are occasionally not adequate enough.

SUMMARY OF THE INVENTION

It is an object of the invention to provide an image retrieval system of the kind set forth with an improved mechanism for determining the similarity between the candidate image and the query image. This object is achieved in an image retrieval system having the determining unit arranged to, determine the first similarity on the basis of information conveyed by the first candidate color histogram in response to information requested by the first query color histogram. Determining the similarity between the respective images using an information theoretic measure is superior to the known techniques. The image retrieval system according to the invention is better able to establish the similarity between the query image and the images in the database. So, the image retrieval system according to the invention is superior in finding similar images and in avoiding images that are not similar enough. Furthermore, the calculation of the information theoretic measure requires less computational effort than the known techniques.

An embodiment of the image retrieval system according to the invention uses a Kullback informational divergence. The Kullback informational divergence is a measure for determining how different one statistical distribution is from another statistical distribution. The inventor has realized that a color histogram can be treated as a statistical distribution and that the Kullback informational divergence can be applied for comparing the candidate color histogram with the query color histogram. Experiments have shown that retrieval of images on the basis of a similarity obtained from applying the Kullback informational divergence on the respective color histograms gives very good results. Furthermore, the calculation of the Kullback informational divergence requires less computational effort than the known techniques, which is very important since a large number of candidate images may need to be compared with the query image.

Another embodiment of the image retrieval system also considers entropy of similarity coefficients. By determining the entropy of the distribution of the similarity coefficients, an indication of the flatness of this distribution is obtained. Since a particular similarity coefficient indicates the similarity between the candidate color histogram and the query color histogram for the particular bin, the obtained flatness is a measure for the similarity of the candidate color histogram and the query color histogram over all bins. Experiments have shown that retrieval of images on the basis of a similarity based on the entropy measure gives very good results. Furthermore, the calculation of the entropy requires less computational effort than the known techniques, which is very important since a large number of candidate images may need to be compared with the query image.

A further embodiment of the image retrieval system according to the invention compares two color histograms of respective regions of the candidate image with two color histograms of corresponding regions of the query image, the spatial information in the respective images being employed when determining the similarity. This improves the accuracy of determining the similarity between the candidate image and the query image and a better discrimination among the images in the database can be achieved.

A still further embodiment of the image retrieval system according to the invention uses median statistics for determining the overall similarity from the similarities o the regions. This is better than simply averaging the similarities of the regions. The median statistics suppress the effect of large outliners which would negatively influence the perceive similarity of the candidate image and the query image.

An embodiment of the image retrieval system according to the invention allows the user to compose the query image. Such a query image can be completely specified according to the user's wishes. The user may compose the query image by taking samples from images available in the system or may sketch an image from scratch.

It is a further object of the invention to provide a method of the kind set forth with an improved step for determining the similarity between the candidate image and the query image on the basis of the candidate color histogram and the query color histogram. This object is achieved according to the invention in a method that is characterized in that the determining step includes determining the similarity on the basis of information conveyed by the candidate color histogram in response to information requested by the query color histogram. By determining the similarity between the respective images through an information theoretic measure better results are obtained. When this method is applied for searching an image, a better discrimination among the searched images with respect to the query image can be obtained. A further advantage of the method according to the invention is that the calculation of the information theoretic measure requires less computational effort than the known techniques, which is particularly important for searching through large collections of images.

Further advantageous embodiments of the invention are discussed below.

BRIEF DESCRIPTION OF THE DRAWINGS

The invention and its attendant advantages will be further elucidated with the aid of exemplary embodiments and the accompanying schematic drawings, whereby.

Corresponding features in the various Figures are denoted by the same reference symbols.

DESCRIPTION OF THE PREFERRED EMBODIMENTS

Figure 1:
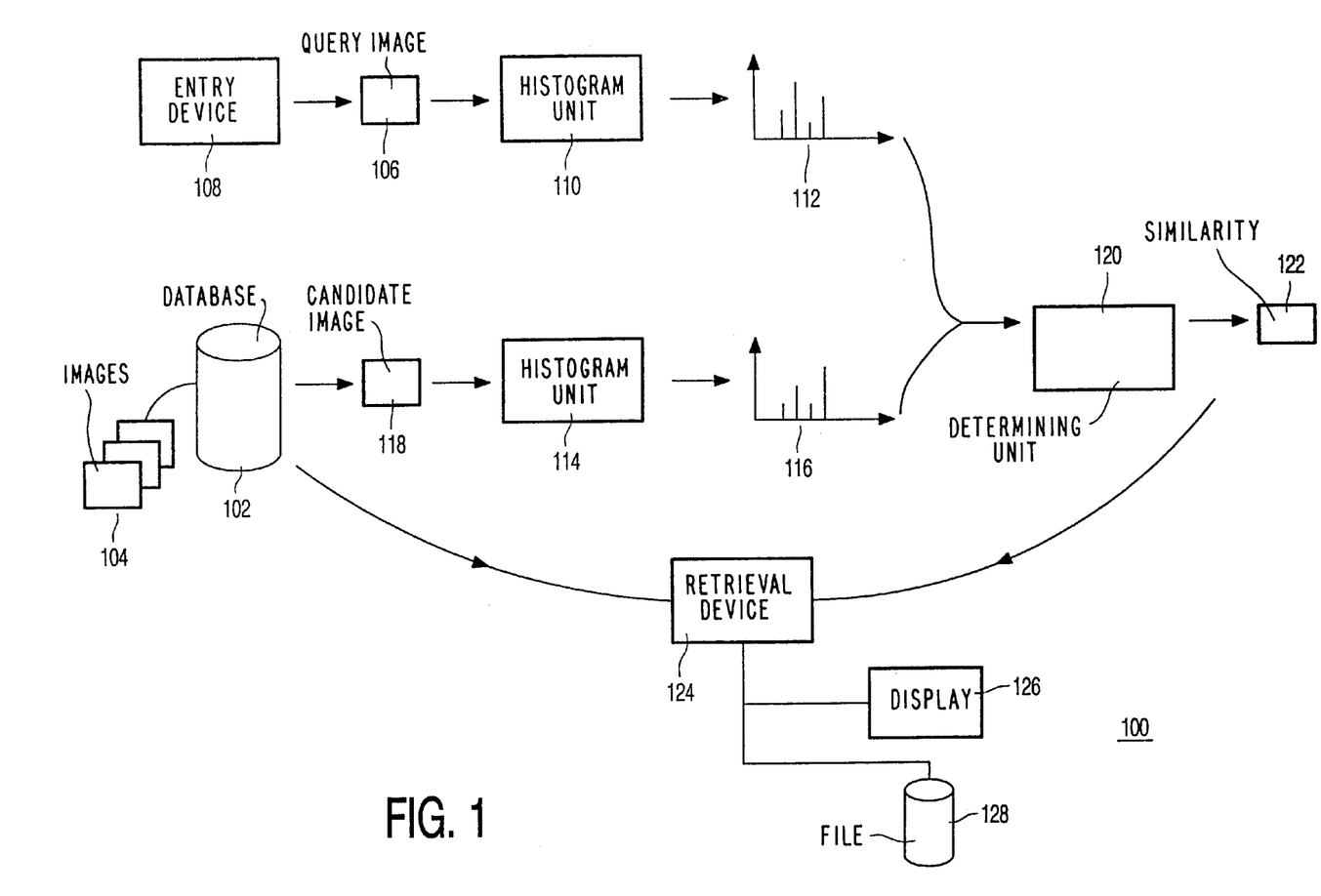
FIG. 1 schematically shows an image retrieval system according to the invention, FIG. 2 schematically shows an image retrieval system according to the invention with multiple color histograms per image.

FIG. 1 schematically shows an image retrieval system according to the invention. The system 100 includes a database 102 with a potentially large collection 104 of images. A purpose of such a system is to retrieve from the collection one or more images that match the wishes of a user of the system. Those wishes are specified via a query image 106, which the user can enter into the system via entry means 108. The entry unit may allow the user to compose the query image from a number of existing images or to create the query image from scratch. The system compares the query image with the candidate images in the database and determines for each candidate image how similar it is to the query image. The system ranks the candidate images according to the established similarity. The system 100 compares images on the basis of their color histogram. To this end, the system includes first histogram unit 110 to determine a query color histogram 112 from the query image 106. The process of determining a color histogram from an image is explained in FIG. 3 below. The system also includes second histogram unit 114 to determine a candidate color histogram 116 from a particular candidate image 118. The first histogram unit and the second histogram unit may be integrated into one histogram means, which can act on the query image for generating the query color histogram and on the particular candidate image for generating the candidate color histogram respectively. The system further includes determining unit 120 to determine a similarity 122 on the basis of the query color histogram 112 and the candidate color histogram 116. Based on the similarity, the system presents a ranking of the candidate image on a display 126. The user may select an image from this ranking which is retrieved from the database via retrieval means 124 for further processing. This further processing may include temporarily storing the image in a file 128 for further selection. This may be implemented as that the system retrieves a number of candidate images and stores these in the file 128, from where the user makes a final selection as to which image is desired. In such a way of working, the system makes a first selection from the large collection in the database 102 and the user selects the image or images from the much smaller collection in file 128.

In a first embodiment of the image retrieval system according to the invention, the two color histograms between which a similarity must be determined are treated as two probability distributions. The question as how similar the two histograms a can then be answered by measuring how different the one probability distribution is from other. This difference between two statistical distributions is called informational divergence or Kullback informational divergence and is calculated with the following equation:

$$D(Q\|P) = \sum_{x \in X} Q(x) \log \frac{Q(x)}{P(x)} \quad (1)$$

In which:

Q(x) is the normalized query color histogram,

P(x) is the normalized candidate color histogram, and

D(Q∥P) is the Kullback informational divergence.

A more detailed discussion on the Kullback informational divergence is presented in the textbook "Information Theory: Coding Theorems for Discrete Memoryless Systems", I. Csizar and J. Komer, Akademia Kiado, Budapest, 1981, pages 19–22.

Equation (1) can be rewritten to $$D(Q\|P) = \sum_{x \in X} Q(x) \log Q(x) - \sum_{x \in X} Q(x) \log P(x) \quad (2)$$

The first term in equation (2) is the entropy of distribution Q(x) and is fully determined by the contents of the query.

Therefore this first term is the same for all candidate images of the database and need not be considered when ranking the candidate images with respect to similarity to the query image. According to this first embodiment of the image retrieval system according to the invention, the similarity between the candidate image and the query image is therefore calculated with the following equation:

$$S_K(Q, P) = \sum_{x \in X} Q(x) \log P(x) \tag{3}$$

In which:
   $S_K(Q,P)$ is the similarity between the candidate image and the query image,
   $Q(x)$ is the normalized query color histogram, and
   $P(x)$ is the normalized candidate color histogram.

The value of $S_K(O,P)$ is used to rank the candidate image with respect to their similarity with the query image. A relatively large value indicates that two images similar and a relatively low value indicates that two images are dissimilar.

In a second embodiment of the image retrieval system according to the invention, similarity coefficients are determined for each pair of corresponding bins of the two color histograms between which a similarity must be determined. Subsequently the obtained collection of similarity coefficients is treated as a probability distribution and the question as how similar the two histograms are, is then answered by analyzing this probability distribution. In this embodiment, the similarity coefficients are calculated using the following equation:

$$r_i(P, Q) = \frac{\min(p_i, q_i)}{\max(p_i, q_i)} \tag{4}$$

In which:
   $r_i(P,Q)$ is the similarity coefficient between bin i of the candidate color histogram and bin i of the query color histogram,
   $p_i$ is the number of pixels in bin i of the candidate color histogram, and
   $q_i$ is the number of pixels in bin i of the query color histogram.

Especially in cases where the candidate images in the database have significantly different color histograms, comparison on the basis of the similarity coefficients as such is not sufficient. Therefore the distribution of the similarity coefficients over the bins is analyzed. First the distribution is normalized using the following equation:

$$s_i = \frac{r_i}{\sum_{j=0}^{N-1} r_j}; i \in [0, N-1] \tag{5}$$

In which:
   $s_i$ is an element of the normalized probability distribution S,
   $r_i$ is calculated using equation (4), and
   N is the number of bins.

The flatness of the distribution S is used in addition to the similarity coefficients themselves for determining the similarity between the candidate color histogram and the query color histogram. A flat distribution indicates a good overall match, while on with few peaks indicates a good match over a few bins. The level of flatness of the probability distribution S is measured by calculating its entropy using the following equation:

$$H(S) = -\sum_{j=0}^{N-1} s_j \log(s_j) \tag{6}$$

In which:
   $H(S)$ is the entropy of distribution S,
   $s_j$ is an element of the distribution S, calculated using equation (5), and
   N is the number of bins.

$H(S)$ lies in the range $[0, \log(N)]$. $H(S) = \log(N)$ indicates that the similarity coefficients of all bins are equal, i.e. $r_i = r_j$, i,j element of $[0, N-1]$. The value $H(S)=0$ indicates that there is at most one histogram bin over which the histograms P and Q are similar. In this embodiment of the image retrieval system according to the invention, the similarity is obtained by combining the entropy $H(S)$ and the sum of the similarity coefficients using the following equation:

$$S_E(P, Q) = H(S) \times \sum_{j=0}^{N-1} r_j \tag{7}$$

In which:
   $S_E(Q,P)$ is the similarity between the candidate image and the query image,
   $H(S)$ is the entropy according to equation (6), and
   $r_j$ is the similarity coefficient according to equation (4).

$S_E(Q,P)$ lies in the range $[0, N\log(N)]$. A larger value of $S_E(Q,P)$ indicates a higher similarity between the candidate color histogram P and the query color histogram Q. If $S_E(Q,P)=0$, P and Q are very dissimilar. If $S_E(Q,P)=N\log(N)$, P and Q are identical.

In the embodiments of the image retrieval system described above, a single color histogram is made from the whole image. Because of this, the spatial information from the image is lost and the comparison of two images reflects only global similarity. For example if a user enters a query image with a sky at the top and sand at the bottom, the retrieved images are expected to have a mix of blue and beige, but not necessarily a sky and sand. A desirable result for the retrieved candidate images would be images with blue at the top and beige at the bottom. In order to achieve this result, a further embodiment of the system according to the invention determines a color histogram for a number of respective regions of the query image and compares these determined histograms with histograms of corresponding regions of the candidate image. The query image may be divided into regions using pre-fixed boundaries, e.g. the division of the image into a number of rectangles. Furthermore, the regions may be indicated manually by the user taking into account important objects in the query image. In this way, the user forces that a histogram is made for a region comprising the object of interest. The choice of the region size is important since it governs the emphasis that is given to local information. In one extreme, the whole image is considered as a single region so that only global information is used for the comparison. In the other extreme, the region size matches the individual pixels. In one of the further embodiments of the retrieval system according to the invention, the images are divided into 4×4 rectangular regions.

Figure 2:
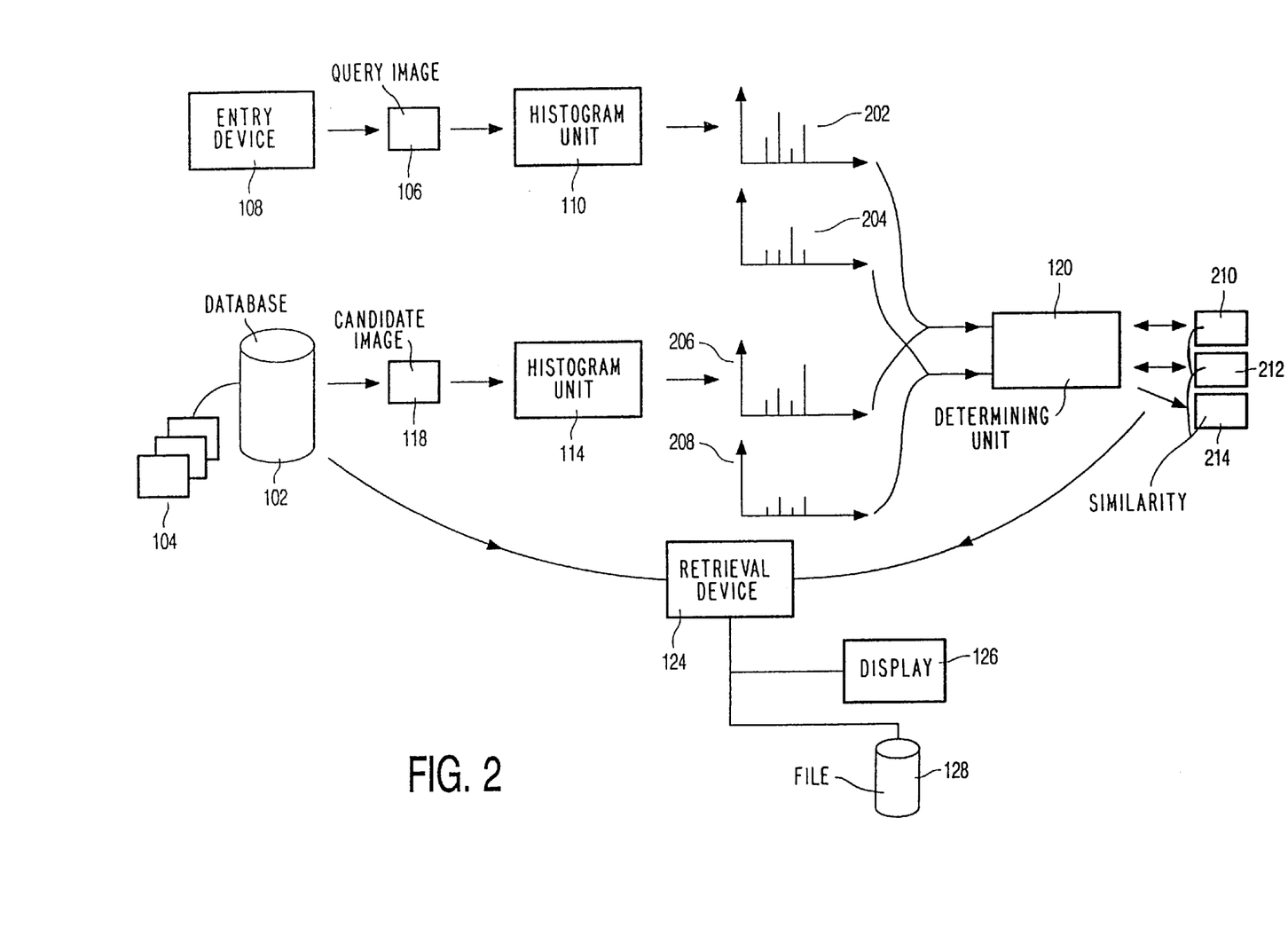

FIG. 2 schematically shows an image retrieval system according to the invention with multiple color histograms per image. In this system, the first histogram means 110 determine a first query color histogram 202 of a first region of the query image 106 and a second query color histogram 204 of a second region of the query image 106. In the same way, the second histogram means 114 determine a first candidate color histogram 206 of a first region of the particular candidate image 118 and a second candidate color histogram 208 of a second region of the particular candidate image 118. The example in FIG. 2 shows 2 color histograms per image, but this is mainly for the purpose of illustration since in practice the system will have more than 2 color histograms per image, for instance 8 or 16. In a subsequent step the determining means 120 of the system makes multiple pair-wise comparisons of the respective color histograms and determines a similarity for each comparison. These individual similarities are combined into one overall similarity indicating how similar the candidate image and the query image are, taking into account the local information. The determining means determine a first similarity 210 on the basis of the first query color histogram 202 and the first candidate color histogram 206. This first similarity 210 indicates how similar is the first region of the query image 106 to the first region of the candidate image 118. The determining means further determine a second similarity 212 on the basis of the second query color histogram 204 and the second candidate color histogram 208. This second similarity 212 indicates how similar is the second region of the query image 106 to the second region of the candidate image 118. Subsequently, the determining means determine an overall similarity 214 on the basis of the first similarity 210 and the second similarity 212. This overall similarity 214 indicates the similarity between the query image 106 and the candidate image as a whole, taking into account the local information captured through the division in regions. The overall similarity 214 is used to rank the candidate images stored in the database 102.

Combining the region similarities corresponding to the respective regions of the query image and the candidate image into an overall similarity should avoid that too much emphasis is put on any one the region similarities. Therefore, the further embodiments of the system according to the invention use the median of the region similarities as a measure of the similarity for the whole image. In the further embodiment of the system using the Kullback informational divergence, the overall similarity between the candidate image and the query image, based on similarities of respective regions of the images is calculating according to the following equation:

$$\hat{S}_K(I_Q, I_P) = \underset{(k,l \in [0,M-1])\{S_K(Q_{kl}, P_{kl})\}}{\text{Median}} \quad (8)$$

In which:

$I_Q$ is the query image, $I_p$ is the particular candidate image, $\hat{S}_K(I_Q, I_P)$ is the overall similarity between image P and Q, $Q_{kl}$ is the color histogram of region k,l of the query image, $P_{kl}$ is the color histogram of region k,l of the particular candidate image, $S_K(Q_{kl}, P_{kl})$ is the similarity between region k,l of the candidate image and region k,l of the query image, based on the Kullback informational divergence according to equation (3), and M is the number of regions into which the image is divided in the horizontal and in the vertical direction.

The median function sorts the individual region similarities and selects the middle one to be the overall similarity.

In the further embodiment of the system using the entropy measure, the overall similarity between the candidate image and the query image, based on similarities of respective regions of the images is calculated according to the following equation:

$$\hat{S}_E(I_Q, I_P) = \underset{(k,l \in [0,M-1])\{S_E(Q_{kl}, P_{kl})\}}{\text{Median}} \quad (9)$$

In which:

$I_Q$ is the query image, $I_P$ is the particular candidate image, $\hat{S}_E(I_Q, I_P)$ is the overall similarity between image P and Q, $Q_{kl}$ is the color histogram of region k,l of the query image, $P_{kl}$ is the color histogram of region k,l of the particular candidate image, $S_E(Q_{kl}, P_{kl})$ is the similarity between region k,l of the candidate image and region k,l of the query image, based on the entropy measure according to equation (7), and M is the number of regions into which the image is divided in the horizontal and in the vertical direction.

Figure 3:
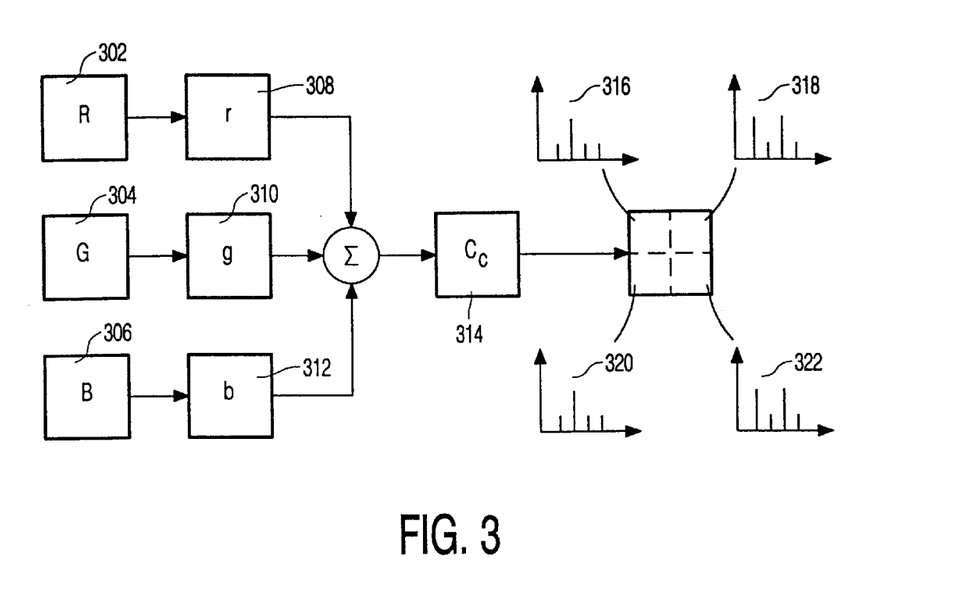
FIG. 3 shows the process of determining a color histogram from an image.

FIG. 3 shows the process of determining a color histogram from an image. Color images in the system according to the invention are represented by the three color components of the RGB (Red, Green and Blue) color space. However, the invention can also be applied for images represented in another color space. A histogram is constructed by independently quantizing the Red component 302, the Green component 304 and the Blue component 306 of every pixel. This color quantization results in the representation of the entire color spectrum by a smaller set of discrete values referred to as quantization levels. This is a many-to-one mapping and the set of colors mapped to the same quantization level forms a quantization cell. The number of quantization levels is referred to as $q_L$. A histogram is built by uniformly quantizing the R, G and B components of every pixel, mapping the three quantized values 308, 310 and 312 to a composite color value 314, and incrementing the corresponding histogram bin. The quantized color components r, g and b are mapped to a 1-dimensional composite space using the following equation:

$$C_c(r,g,b) = \alpha_r \times r + \alpha_g \times g + \alpha_b \times b \quad (10)$$

In which:

$C_c$ is the composite color value, $\alpha_r$ is the mapping coefficient for the R component, $\alpha_g$ is the mapping coefficient for the G component, $\alpha_b$ is the mapping coefficient for the B component, Each quantized component r, g and b takes a value between 0 and $(q_L-1)$ and there are $(q_L)^3$ quantized possible combinations. To ensure a unique mapping from the R, G and B components to a composite color value the following scheme is chosen for the mapping coefficients: $\alpha_r = (q_L)^2$, $\alpha_g = (q_L)^1$, and $\alpha_b = (q_L)^0 = 1$. After each pixel has been mapped to a composite color value and the histogram bins have been filled with the number of corresponding appearances, the histogram is normalized for further use. Normalization comes down to dividing the number of pixels in each bin by the total number of pixels in all bins. After normalization, a bin contains a number representing the fraction of the pixels belonging to that bin rather than a number representing the sum of those pixels. Throughout this document, a reference to a color histogram is generally to be considered as a reference to a normalized color histogram.

In the further embodiments of the image retrieval system according to the invention, multiple histograms are generated from a single image. Each of the multiple histogram is a histogram of a specific region of the image. In the example of FIG. 3, 4 histograms, 316, 318, 320 and 322, are generated for the four indicated regions of the image.

Figure 4:
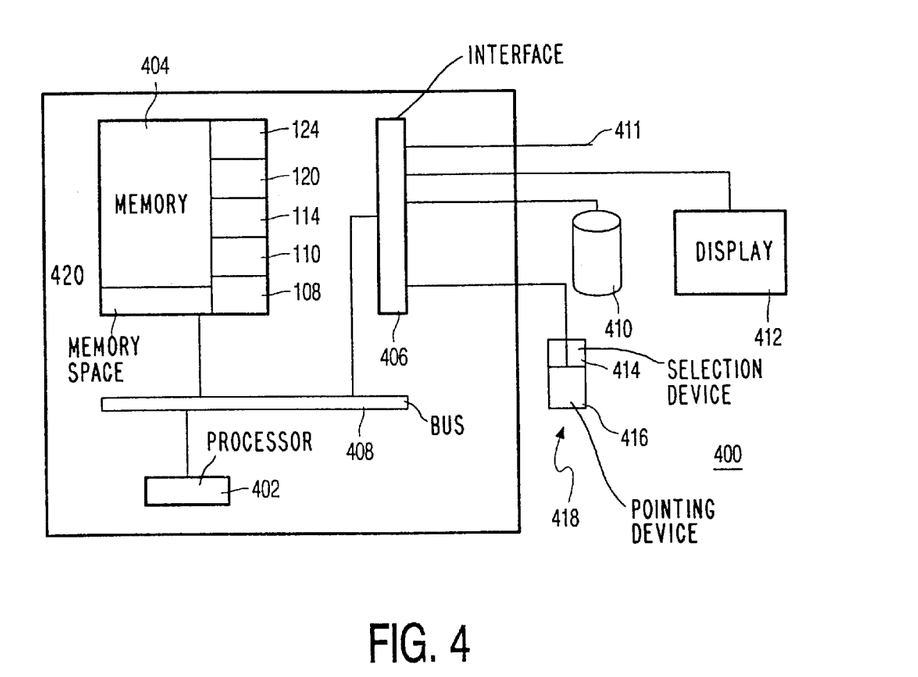
FIG. 4 shows the most important components of the image retrieval system according to the invention.

FIG. 4 shows the most important components of the image retrieval system according to the invention. The image retrieval system 400 is implemented according to a known architecture and can be realized on a general purpose computer. The image retrieval system has a processor 402 for carrying out instructions of an application program loaded into working memory 404. The image retrieval system further has an interface 406 for communication with peripheral devices. There is a bus 408 for exchange of commands and data between the various components of the system. The peripherals of the image retrieval system include a storage medium 410 containing the executable programs, the database with images, and various other data. The storage medium 410 can be realized as various separate devices, potentially of different kind of storage device. Application of the invention is not restricted by the type of device and storage devices which can be used include optical disc, magnetic disc, tape, chip card, solid state or some combination of these devices. Furthermore, some of the data may be at a remote location and the image retrieval system may be connected to such a location by a network via connection 411. The peripherals of the image retrieval system further include a display 412 on which the system displays, amongst others, the query image and the candidate images. Furthermore the peripherals preferably include a selection device 414 and a pointing device 416 with which the user can move a cursor on the display. Devices 414 and 416 can be integrated into one selecting means 418 like a computer mouse with one or more selection buttons. However, other devices like a track ball, graphic tablet, joystick, or touch sensitive display are also possible. In order to carry out the various tasks, a number of software modules are loaded into the working memory 404, among which are modules constituting: entry means 108, first histogram means 110, second histogram means 114, determining means 120 and retrieval means 124. Furthermore, the working memory 404 has memory space 420 for temporarily storing input and output data and intermediate results, like the respective histograms and the determined similarity.

Figure 5:
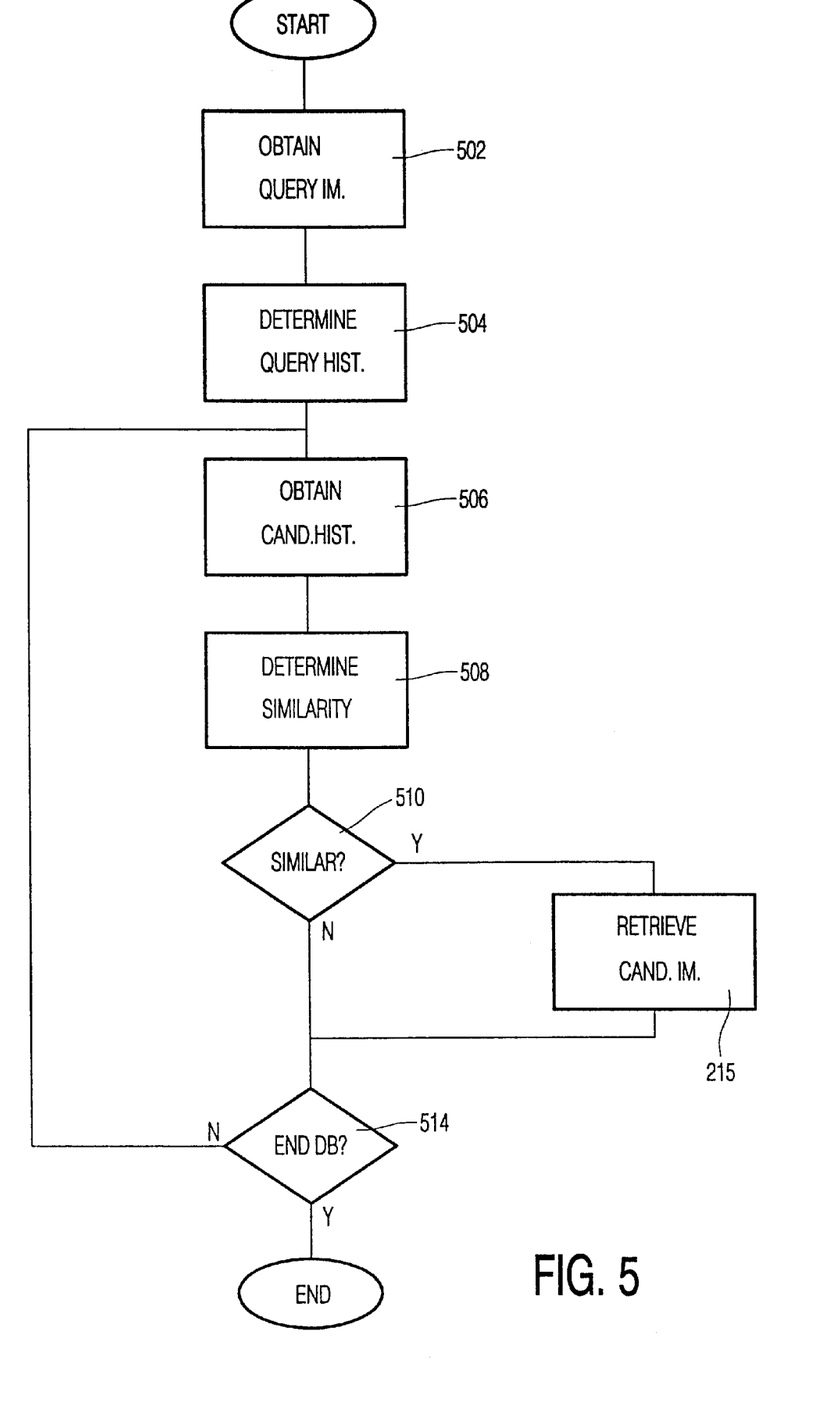
FIG. 5 shows an overview of the method according to the invention.

FIG. 5 shows an overview of the method according to the invention. In a first step 502, a query image is obtained containing the wishes of the user. This image may be composed from existing images or may be sketched by the user, possibly on the basis of an existing image. Then in a second step 504, a query color histogram of the query image is determined. This query color histogram will be used in comparing the query image with candidate images from a database. In a third step 506, a candidate color histogram of one of such candidate images is obtained. Preferably this candidate color histogram has been prepared in advance at the moment the candidate image had been stored in the database. Then obtaining the candidate color histogram now, comes down to simply retrieving the histogram. Alternatively, the candidate color histogram could be created at this instant, i.e. at the time when it is needed. When the candidate color histogram has been obtained, the similarity between the query image and the candidate image is determined in a determining step 508. If in a comparison step 510 it is ascertained that the images are similar enough, the particular candidate image is retrieved from the database in retrieval step 512. The particular candidate image may be directly presented to the user or may be temporarily stored in a file for later inspection. Then in step 514 it is determined whether all candidates images in the database have been dealt with. If this is not the case, a candidate color histogram of a next candidate image is obtained in step 506 and the process is repeated for this next candidate image.

What is claimed is:

1. An image retrieval system comprising:

a database with candidate images;

entry means for entering a query image;

first histogram means for deriving a first query color histogram from the query image;

second histogram means for deriving a first candidate color histogram from a selected candidate image;

determining means for determining a first similarity between the selected candidate image and the query image on the basis of either:

i) a Kullback informational divergence between the first candidate color histogram and the first query color histogram; or ii) the entropy of the distribution of similarity coefficients over bins of the first candidate color histogram and bins of the first query color histogram; and retrieval means for retrieval of the selected candidate image, selection thereof being determined by the determining means on the basis of information conveyed by the first candidate color histogram in response to information requested by the first query color histogram.

2. An image retrieval system according to claim 1, wherein the determining means are arranged to determine the first similarity on the basis of the Kullback informational divergence between the first candidate color histogram and the first query color histogram.

3. An image retrieval system according to claim 2, wherein the Kullback informational divergence is according to the following equation:

$$S_K(Q, P) = \sum_{x \in X} Q(x) \log P(x)$$

in which:

$S_K(O,P)$ is the similarity between the candidate image and the query image, $O(x)$ is the normalized first query color histogram, and $P(x)$ is the normalized first candidate color histogram.

4. An image retrieval system according to claim 1, wherein the determining means are arranged to determine the first similarity on the basis of the entropy of the distribution of said similarity coefficients over the bins of the first candidate color histogram and the bins of the first query color histogram.

5. An image retrieval system according to claim 4, wherein the entropy of the distribution of said similarity coefficients is according to the following equation:

$$S_E(P, Q) = H(S) \times \sum_{j=0}^{N-1} r_j$$

in which:

$S_E(O,P)$ is the similarity between the candidate image and the query image,

H(S) is the entropy of the probability distribution S of the similarity coefficients, and $i_j$ is the similarity coefficient between bin j of the candidate color histogram and bin j of the query color histogram.

6. An image retrieval system according to claim 1, wherein:

the first histogram means are arranged to derive the first query color histogram from a first region of the query image and to derive a second query color histogram from a second region of the query image, the second histogram means are arranged to derive the first candidate color histogram from a first region of the selected candidate image and to derive a second candidate color histogram from a second region of the selected candidate image, and the determining means are arranged to determine a second similarity between the selected candidate image and the query image on the basis of the second query color histogram and the second candidate color histogram, and to determine an overall similarity between the selected candidate image and the query image on the basis of a combination of the first and second similarities.

7. An image retrieval system according to claim 6, wherein the determining means are arranged to determine the overall similarity using median statistics for combining the first similarity and the second similarity.

8. An image retrieval system according to claim 1, wherein the entry means are arranged to enable the user to compose the query image.

9. A method for determining a similarity between a candidate image and a query image, the method comprising the following steps:

a first step for obtaining the query image, a second step for deriving a color histogram of the query image, a third step for obtaining a color histogram of the candidate image, and a determining step for determining similarity between the candidate image and the query image on the basis of the candidate color histogram and the query color histogram such determination being on the basis of either:

i) a Kullback informational divergence between the candidate color histogram and the query color histogram; or ii) the entropy of the distribution of similarity coefficients over bins of the candidate color histogram and bins of the query color histogram.

\* \* \* \* \*